July 5, 1960  J. E. MILLER  2,943,895
PACKING FOR CYLINDER LINERS
Filed Nov. 29, 1956  2 Sheets-Sheet 1
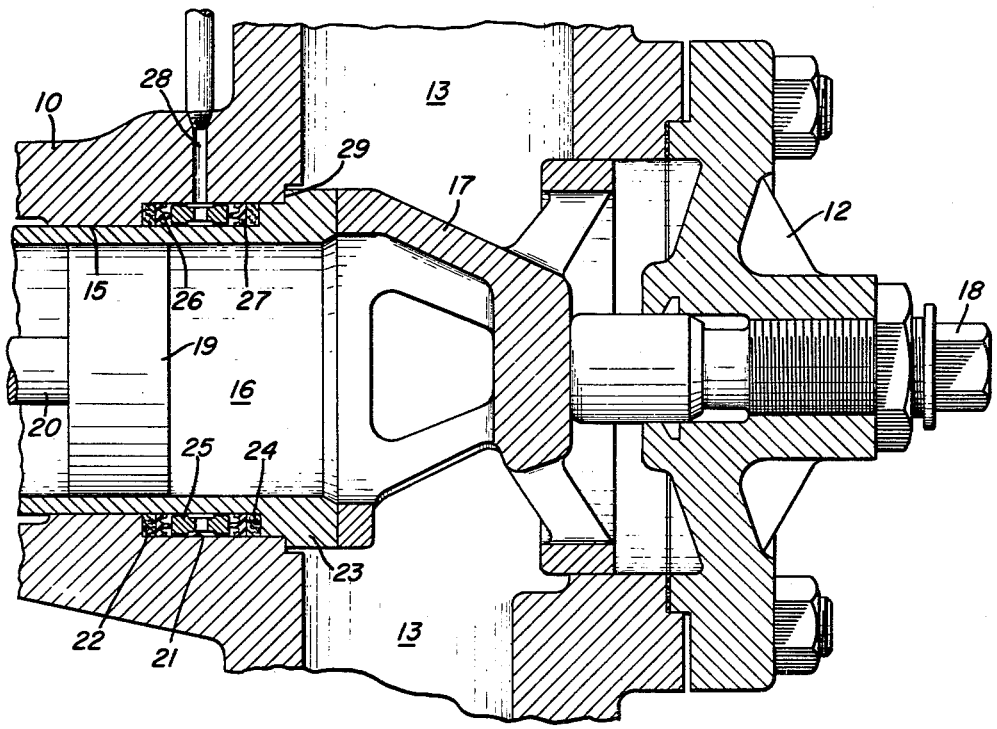
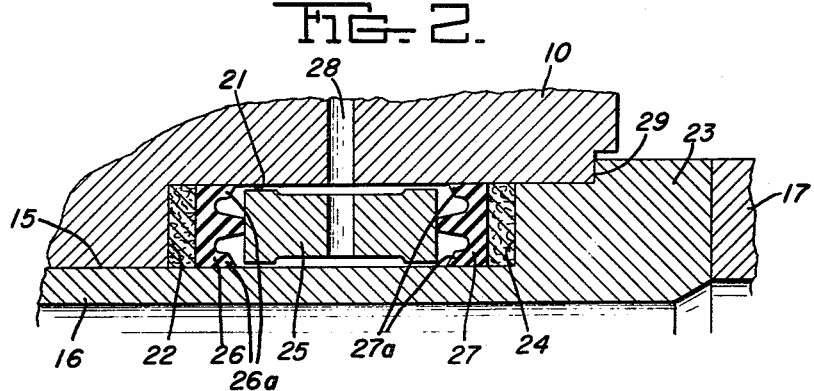
INVENTOR
JOHN E. MILLER,
By: Donald G. Dalton
his Attorney.

July 5, 1960   J. E. MILLER   2,943,895
PACKING FOR CYLINDER LINERS
Filed Nov. 29, 1956   2 Sheets-Sheet 2
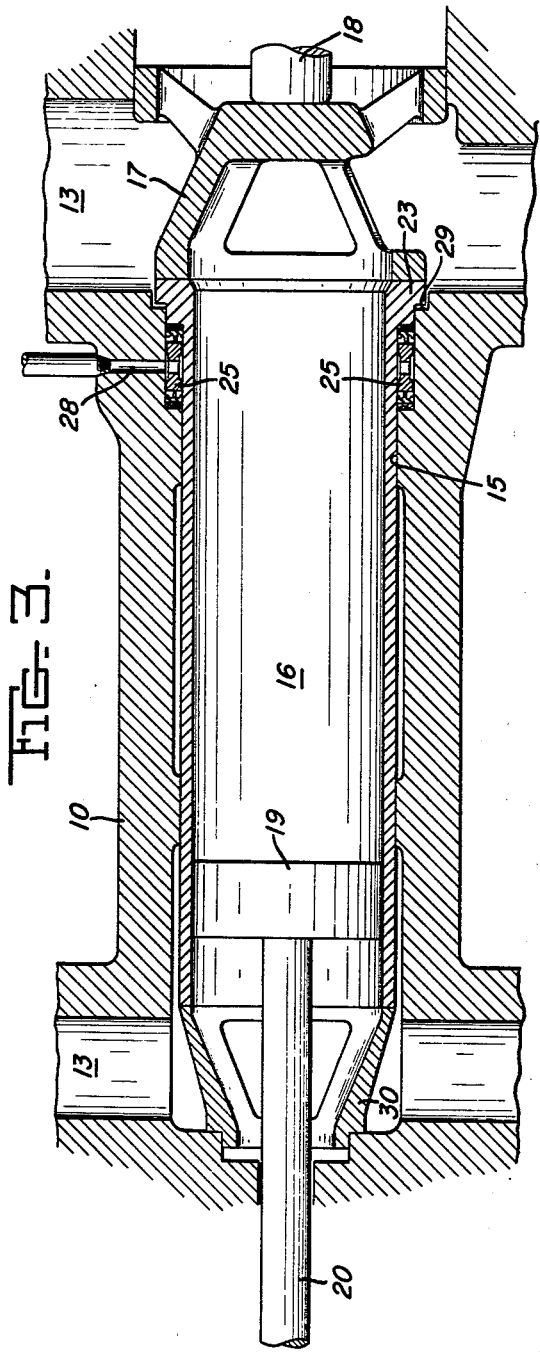
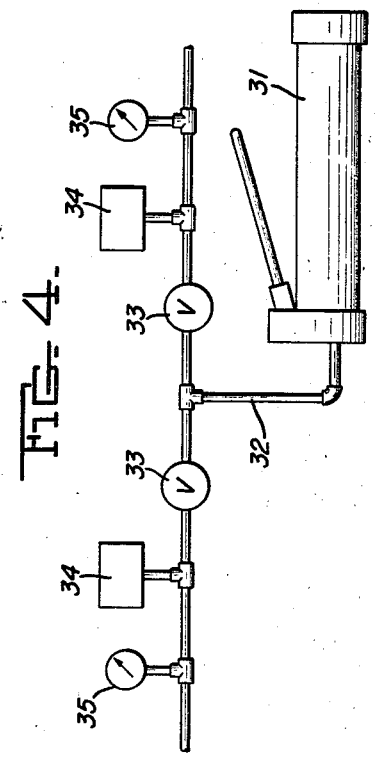
INVENTOR:
JOHN E. MILLER,
By: Donald G. Dalton
his Attorney.

2,943,895
PACKING FOR CYLINDER LINERS

John E. Miller, Dallas, Tex., assignor to United States Steel Corporation, a corporation of New Jersey Filed Nov. 29, 1956, Ser. No. 625,125

3 Claims. (Cl. 309—3)

This invention relates to an improved packing arrangement for cylinder liners.

My packing arrangement has general application to liners which fit within a cylinder bore and contain a reciprocable element, and where pressures encountered are of a magnitude that causes difficulty in maintaining a fluid-tight seal between the walls of the liner and cylinder bore. One example is in slush pumps used for circulating mud in drilling oil wells. Conventionally slush pump cylinders are equipped with replaceable liners of abrasion resistant metal, and the walls of the liner and cylinder bore have confronting shoulders between which packing rings are compressed. A metal-to-metal bearing contact between the liner and cylinder is desirable for fixing the position of the liner and preventing its pulsation as the piston reciprocates therein, but such contact also prevents any further compression of the packing beyond that applied initially. Therefore the packing fails readily and must be replaced frequently. An alternative is to avoid metal-to-metal contact, whereby the packing can be compressed additionally as the parts wear. The cylinder wall can contain tell-tale holes opposite the packing, and visible leakage therethrough indicates need for applying further compression.

An object of the present invention is to provide a packing arrangement which permits a metal-to-metal bearing contact between a liner and a cylinder and also permits adjustability in the compression on the packing.

A further object is to provide a packing arrangement in which the packing is subjected to hydraulic pressure to balance pressures developed within a cylinder.

In accomplishing these and other objects of the invention, I have provided improved details of structure, preferred forms of which are shown in the accompanying drawings, in which:

Figure 1 is a fragmentary longitudinal sectional view of one form of cylinder and liner equipped with packing in accordance with my invention;

Figure 2 is a fragmentary vertical sectional view of the packing on a larger scale;

Figure 3 is a longitudinal sectional view similar to Figure 1, but showing a modified form; and Figure 4 is a diagrammatic view of a device for pressurizing the packing adapted to be used with either form of my invention.

Figure 1 shows a portion of a metal cylinder 10, the outer end of which is closed by a removable cylinder head 12. The usual fluid passages 13 are formed in the cylinder walls and lead to conventional inlet and discharge valves, not shown. The cylinder also has the usual bore 15 into which is fitted a replaceable liner 16 of abrasion resistant metal. The liner is held in position by a spacer 17, which abuts its outer end, and a screw 18, which is threadedly engaged with the cylinder head 12 and abuts the outer end of the spacer. Thus the liner can be inserted or removed through the end of the cylinder after the cylinder head and spacer are removed.

A reciprocable piston 19 is received in the liner and is connected through a piston rod 20 to any suitable conventional drive means, not shown.

The cylinder bore 15 contains a counterbore 21, the extremity of which constitutes an annular internal shoulder 22. The outside of the liner 16 has an enlargement 23 which fits within the counterbore 21 and the extremity of which constitutes an annular external shoulder 24. Packing is fitted within the counterbore between the confronting shoulders 22 and 24, but is free of these shoulders and not compressed thereby. As best shown in Figure 2, the preferred packing includes a central lantern ring 25 and resilient rings 26 and 27 on opposite sides thereof and having sealing lips 26a and 27a respectively facing said lantern ring. The cylinder wall opposite the lantern ring contains a radial passage 28. In the form of the invention shown in Figure 1, the liner has a second external shoulder 29 which abuts the cylinder wall adjacent the end of the counterbore 21 to establish a metal-to-metal bearing contact between the liner and the cylinder.

Figure 3 shows a modification in which the shoulder 29 on the liner clears the cylinder wall and optionally can be omitted. A second spacer 30 is inserted within the inner end of the cylinder. The inner end of the liner abuts the spacer 30, which in turn abuts the wall at the inner end of the cylinder, thus establishing a metal-to-metal bearing contact. Otherwise this modification is similar to the form of the invention shown in Figure 1 so that it is not necessary to repeat the description.

In both forms of the invention a pressurizing device is connected to the passage 28 which leads to the packing. Figure 4 shows diagrammatically one form of such device, which includes a conventional hand operated hydraulic pump 31, a pipe or tube 32 extending from the pump 31 to the passage 28, and a valve 33, hydraulic accumulator 34 and gage 35 connected into said pipe. Since slush pumps commonly are of the duplex type and have a second cylinder alongside the first, pipe 32 conveniently can have a second branch, as shown, connected to the second cylinder, whereby a single pump 31 can pressurize the packing in both cylinders.

In operation, valve 33 is opened and pump 31 operated manually to force hydraulic fluid, preferably of the lubricating type, through pipe 32 and passage 28 to fill completely the space around the lantern ring 25. The pressure of this fluid seals the lips of the resilient rings 26 and 27 against the walls of the cylinder and liner to effect a fluid-tight seal. Fluid is pumped into the pipe 32 until the gage 35 shows a pressure above that encountered within the cylinder 10, after which the valve 33 is closed. The accumulator 34 reduces any pulsation which reciprocation of the piston 19 produces in the hydraulic system. If pressure on the packing drops, as indicated on gage 35, the pressure can be restored easily by again operating the pump 31. Thus the packing is pressurized entirely by fluid introduced from an external source, and there is no need to move the liner to adjust compression on the packing. Ultimate failure of the packing can be detected almost immediately when the gage indicates an abnormal pressure drop.

The pressures within the cylinder 10 are applied alternately to opposite ends of the liner 16, but the metal-to-metal bearing contact prevents their transmittal to the packing. Instead hydraulic pressure applied to the packing is substantially constant and there is a minimum tendency for breathing or movement between the liner, chamber and packing, thus reducing wear on these parts. Another advantage of my packing arrangement is that it facilitates dismantling of the cylinder and liner, which tends to stick. With the cylinder head 12 removed fluid from the pump 31 can be used to unseat the liner.

While I have shown and described certain preferred embodiments of my invention, it is apparent that other modifications may arise. Therefore, I do not wish to be limited to the disclosure set forth but only by the scope of the appended claims.

I claim:

1. In a reciprocating mechanism which comprises a metal cylinder having a bore and a counterbore at one end of said bore, the inner end of said counterbore forming an internal shoulder, and a metal liner within said bore and having an annular enlargement within said counterbore, said enlargement having an inner face which forms an external shoulder spaced from said internal shoulder, the inside of said liner being adapted to contain fluid under relatively high pressure, the combination therewith of a seal normally preventing leakage of fluid between said cylinder and said liner comprising a pair of spaced apart resilient packing rings within said counterbore and abutting the respective shoulders, the space within said counterbore between said packing rings forming an annular pressure chamber, a lantern ring housed within said chamber, said packing rings having opposed sealing lips directed toward said lantern ring, the wall of said cylinder having a passage communicating with said chamber, means connected with said passage for introducing fluid to said chamber under a pressure greater than the pressure within said liner, fluid within said chamber being in direct contact with the walls of both said cylinder and said liner and acting to expand said sealing lips into sealing engagement with these walls and thus prevent flow in either direction between said chamber and other portions of said counterbore, the pressure within said chamber being transmitted through said packing rings to the shoulders formed on both said liner and said cylinder and acting in opposite directions axially against the liner and cylinder tending to force the liner out of the cylinder, and fastening means holding said liner in said cylinder against pressure within said chamber, whereby fluid leaking past said seal produces a pressure drop in said passage to afford an immediate positive indication of leakage.

2. A combination as defined in claim 1 in which said means establishing metal-to-metal contact includes a second shoulder formed on said liner and abutting the cylinder wall adjacent the end of said bore.

3. A combination as defined in claim 1 in which said means establishing metal-to-metal contact includes spacers at each end of said liner, said spacers abutting the ends of the liner and cylinder.

References Cited in the file of this patent

UNITED STATES PATENTS

| | | |
|---|---|---|
| 1,860,484 | Shimer | May 31, 1932 |
| 2,150,529 | Tremolada | Mar. 14, 1939 |
| 2,260,440 | Cunningham et al. | Oct. 28, 1941 |
| 2,282,254 | Shimer | May 5, 1942 |
| 2,394,715 | Phillips | Feb. 12, 1946 |
| 2,525,747 | Hess | Oct. 10, 1950 |
| 2,548,412 | Walker | Apr. 10, 1951 |
| 2,678,609 | Ashton | May 18, 1954 |
| 2,701,743 | Mattingly et al. | Feb. 8, 1955 |
| 2,717,186 | Campbell | Sept. 6, 1955 |
| 2,831,325 | White | Apr. 22, 1958 |
| 2,832,653 | Wilson | Apr. 29, 1958 |
| 2,845,313 | Benson et al. | July 29, 1958 |

FOREIGN PATENTS

| | | |
|---|---|---|
| 884,260 | Germany | July 23, 1953 |